(12) United States Patent
Lonn (10) Patent No.: US 10,057,079 B2
(45) Date of Patent: Aug. 21, 2018

(54) WIRELESS BUILDING AUTOMATION

(71) Applicant: T-Mobile USA, Inc., Bellevue, WA (US)

(72) Inventor: Joshua David Lonn, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 414 days.

(21) Appl. No.: 14/520,289

(22) Filed: Oct. 21, 2014

(65) Prior Publication Data

US 2016/0109864 A1   Apr. 21, 2016

(51) Int. Cl.
| | | |
|---|---|---|
| *G01M 1/38* | (2006.01) | |
| *G05B 21/00* | (2006.01) | |
| *G05B 13/00* | (2006.01) | |
| *G05B 15/00* | (2006.01) | |
| *H04L 12/28* | (2006.01) | |

(52) U.S. Cl.
CPC ................. *H04L 12/2836* (2013.01)

(58) Field of Classification Search
CPC ............................ G05B 15/02; H04L 12/2836
USPC ........................................................ 700/275
See application file for complete search history.

(56) References Cited

U.S. PATENT DOCUMENTS

| | | | | |
|---|---|---|---|---|
| 2003/0169289 | A1* | 9/2003 | Holt | ............. G06F 8/38 |
| | | | | 715/735 |
| 2008/0183307 | A1* | 7/2008 | Clayton | ........... G05B 19/042 |
| | | | | 700/8 |
| 2008/0288618 | A1* | 11/2008 | Vardi | ............. H04L 67/2823 |
| | | | | 709/223 |
| 2009/0070436 | A1* | 3/2009 | Dawes | ............. G06Q 30/02 |
| | | | | 709/219 |
| 2011/0202185 | A1* | 8/2011 | Imes | ............. H04L 43/08 |
| | | | | 700/277 |
| 2012/0188072 | A1* | 7/2012 | Dawes | ............. G06Q 50/06 |
| | | | | 340/514 |
| 2013/0201316 | A1* | 8/2013 | Binder | ............. H04L 67/12 |
| | | | | 348/77 |
| 2014/0005809 | A1* | 1/2014 | Frei | ............. H04L 29/1249 |
| | | | | 700/90 |
| 2014/0167928 | A1* | 6/2014 | Burd | ............. G06F 17/30893 |
| | | | | 340/12.5 |

* cited by examiner

*Primary Examiner* — Ziaul Karim
(74) *Attorney, Agent, or Firm* — Han Santos, PLLC (57) ABSTRACT

Techniques described herein provide wireless building automation. Embodiments include receiving, by a computing device, a feature setting command associated with a peripheral device from a controlling device. The computing device may identify a peripheral application corresponding to the feature setting command, and transform the feature setting command into a generic command. The computing device may translate the generic control protocol of the generic command to a peripheral control protocol associated with the peripheral application in response to a determination that the peripheral application is a non-native application. The computing device may execute the peripheral application based on the generic command in the peripheral control protocol to generate a command for performance of a certain task on the peripheral device.

27 Claims, 5 Drawing Sheets

WIRELESS BUILDING AUTOMATION

BACKGROUND

Building automation, such as home automation, are used to control basic building functions and features automatically or from remote locations. Building automation may include centralized control (e.g., scheduling and automatic operation) of HVAC heating, ventilation and air conditioning (HVAC), water sprinkler systems, window coverings, security systems, lighting, food preparation appliances, etc. that are associated with a building (e.g., a home, an office, etc.).

Advanced building automation technologies (e.g., new Internet technologies and new automation protocols) and lower hardware costs enable users to control building functions remotely from anywhere in the world using a computing device connected to the Internet. For example, there are currently more than about a dozen building automation protocols with various functionalities. However, these advanced technologies may cause problems of compatibility for building automation components (e.g., appliances) that are made by various manufacturers adopting different building automation protocols. For example, when a user select a building automation component (e.g., security camera), the user has to ensure that this component can be appropriately controlled alone or with other components of a building automation system. This may cause a lot of work in converting a simple house into a house that features building automation.

SUMMARY

Described herein are techniques and systems for wireless building automation. The embodiments are related to a building automation platform that brings together third-party developers, device makers, consumers, etc. that are associated with building automation.

The various embodiments include receiving, by a computing device, a feature setting command associated with a peripheral device. The computing device may identify a peripheral application corresponding to the feature setting command, and transform the feature setting command into a generic command. The computing device may translate the generic control protocol of the generic command to a peripheral control protocol associated with the peripheral application in response to a determination that the peripheral application is a non-native application. The computing device may further execute the peripheral application based on the generic command in the peripheral control protocol to generate a command for performance of a certain task on the peripheral device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Many building automation systems, such as home automation systems on the market are standalone systems, which do not integrate readily with other building automation systems. For example, if a user is not present at the user's residence, it would be difficult for the user to use a simple way (e.g., a single command) to save energy at the user's residence using conventional technologies. She may not lower the temperature of her house, shut off certain or all unnecessary lights, and put all computers into sleep mode at the same time. Processes and systems described herein establish an open building automation platform that brings together third-party developers, device makers, consumers, etc. that are associated with building automation. The platform integrates various building automation systems to allow uses of building automation from a central point.

The platform may include a peripheral controller (e.g., a controlling device), which communicates with a central controller (e.g., a server). In some embodiments, the central controller may install and/or register multiple server side applications corresponding to multiple appliances operated by different building automation systems and/or operated using different automation protocols. In turn, the central controller may manage input and output from the appliances and/or control the appliances.

Illustrative Environment

Figure 1:
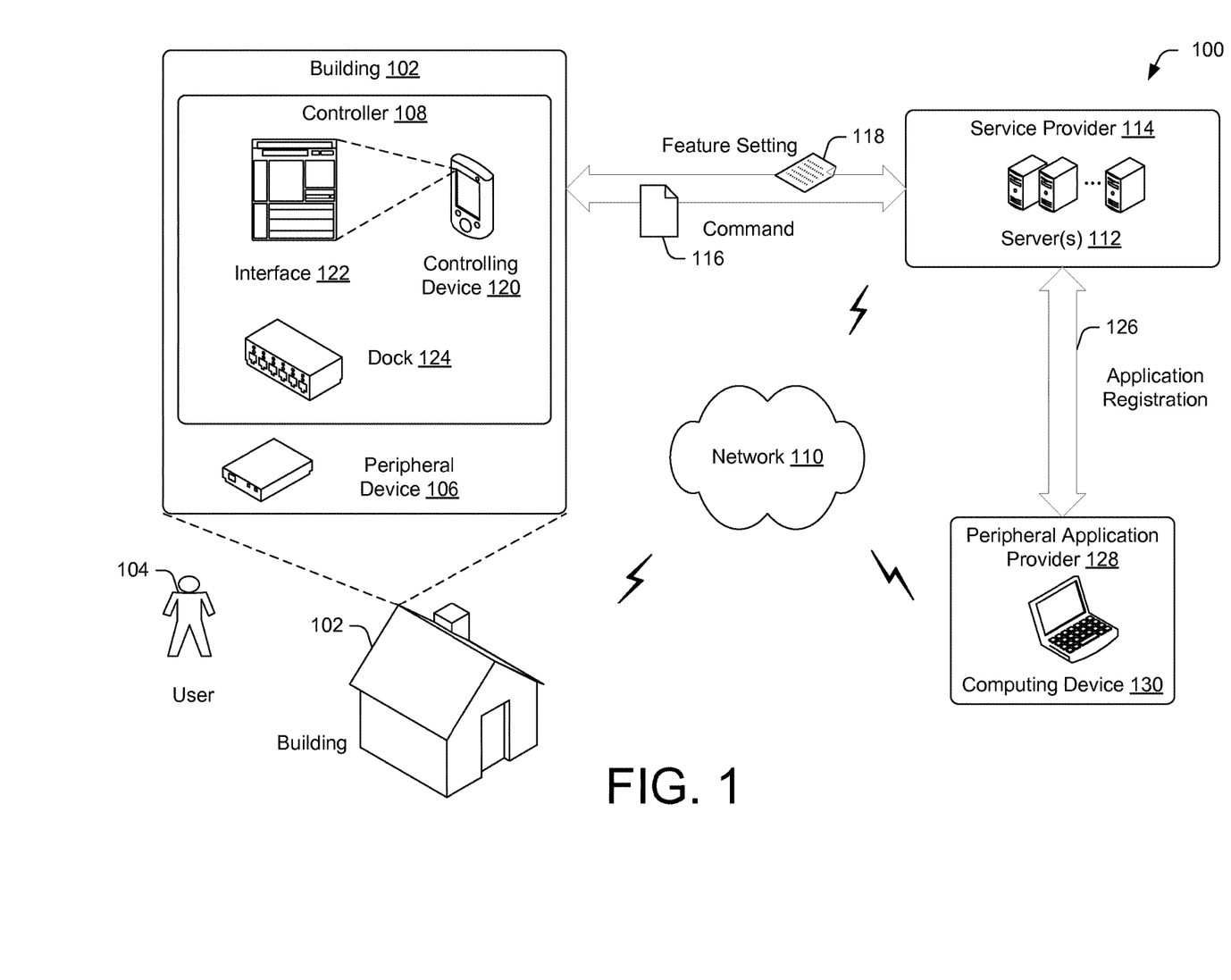
FIG. 1 is a diagram of an illustrative telecommunication environment that enables wireless building automation.

FIG. 1 is a diagram of an illustrative computing environment 100 that enables wireless building automation. The environment 100 includes a building 102 associated with a user 104. The articles "a" and "an" are used herein to refer to one or to more than one (i.e. to at least one) of the grammatical object of the article. By way of example, "a user" means one user or more than one users. The building 102 may include a peripheral device 106, which may include an electrical and/or mechanical device that accomplishes one or more functions associated with the building 102. The one or more functions may be related to outside and/or inside of the premises. For example, the peripheral device 106 may include a hardware controller, a touchscreen panel, a thermostat, an exterior light, a shade/blind controller, a motion detector, a door lock, a door/window sensor, a security monitor, a garage door controller, a security keypad, an alarm siren, an energy meter, a water controller, a weather sensor, etc.

In some embodiments, the peripheral device 106 may be used to automate the building 102 such that the peripheral device 106 may be controlled remotely and/or automatically (e.g., with a trigger). For example, the peripheral device 106 may switch digital or analog signals to perform a task, such as controlling an electrical switch, a dimmer, a display, a motor, a thermostat, etc. In some embodiments, the peripheral device 106 may include a smart plug that a user may plug a device (e.g., a home appliance) into, such that the device may be controlled remotely and/or automatically via the smart plug.

The building 102 may also include a controller 108 associated with the peripheral device 106. The controller 108 may include a plurality of devices that are geographically dispersed while coupled by the network 110. Network 110 may include wired and/or wireless networks that enable communications between the various computing devices described in environment 100. In some embodiments, network 110 may include local area networks (LANs), wide area networks (WAN), mobile telephone networks (MTNs), and other types of networks, possibly used in conjunction with one another, to facilitate communication between the various computing devices (e.g., the controller 108 and a server 112).

Via the server 112, a service provider 114 may provide an automation service to the user 104 for the building 102. The automation service may include a set of related software and/or hardware functionalities that may be reused for different purposes, together with policies that, for example, control the peripheral device 106. In some embodiments, the automation service may be implemented using multiple servers or a collection of servers in a distributed configuration (e.g., cloud computing service, server farm, etc.) or non-distributed configuration.

In some embodiments, the controller 108 may be configured to execute various applications (e.g., peripheral applications) to receive a command from the server 112 and to transmit signals (e.g., a feature setting 118) to the peripheral device 106. In these instances, the controller 108 may communicate with the peripheral device 106 in a various ways, such as TCP/IP, radio waves (WiFi), Zig-bee, infrared, etc. In other embodiments, the peripheral device 106 may have a controlling unit that receives the command 116 from the server 112 and perform a certain task corresponding to the command 116.

In some embodiments, the controller 108 may enable turning off a communication between the peripheral device 106 and the server 112 or placing the peripheral device 106 in a default state in response to a determination that there is a power outage in the building 102. In some embodiments, the controller 108 may implement a security control to protect itself from being accessed and/or controlled by a malicious party. For example, the controller 108 may require the user 104 to provide an authentication credential (e.g., password) to access functionalities of the controller 108.

In some embodiments, the controller 108 may include a controlling device 120 configured to enable the user 104 to control the peripheral device 106 remotely and/or automatically (e.g., with a trigger). For example, the trigger may be a condition, for example, a time event (e.g., sunrise/sunset), a temperature, proximity/motions, etc. In some embodiments, the trigger may be implemented by an automation pattern, which may be defined by the user 104 via the controller 108 or other computing devices (e.g., smart phone or computers). For example, the automation pattern may enable the user 104 to turn off all or a portion of lights in one or more rooms of the building 102 at the same time.

In some embodiments, the controlling device 120 may be configured to receive a user input (e.g., a feature setting, an automation pattern, etc.) and generate a command (e.g., a feature setting command) based on the user input. The controlling device 120 may then transmit the user input to the server 112. For example, the feature setting command may include a command name, a feature name, and the feature setting 118 input by the user 104 via an interface 122.

The controller 108 may also include or interface with a dock 124 configured to enable wireless communication between the controlling device 120 and the server 112. For example, the dock 124 may include a receiving tray to which the controlling device 120 is secured. In some embodiments, the dock 124 may charge a rechargeable cell in the controlling device 120, and/or enable updating of software or firmware contained in the controlling device 120. In some embodiments, the rechargeable cell in the controlling device 120 may be recharged using inductive charging when not in the receiving tray of the dock 124. In some embodiments, the dock 124 may receive cancellation associated with the controlling device 120, and then enable termination of a wireless communication between the controlling device 120 and the server 112.

In some embodiments, the dock 124 may collect information on the plurality of peripheral devices in the building 102. The information may, for example, indicate operational parameters or identifiers of the plurality of peripheral devices. In these instances, the dock 124 may receive information of the building 102, which, for example, may indicate a physical layout of the building 102 and locations of the plurality of peripheral devices in the building 102. The dock 124 may transmit the information of the plurality of peripheral devices and the information of the building 102 to the server 112.

In some embodiments, the dock 12 or other parts of the controller 108 may also enable a wireless connection between the server 112 and the peripheral device 106. For instances, the dock 124 may enable generation of the feature setting 118 associated with the peripheral device 106, and then enable association of a button of the controlling device 120 with the feature setting 118. In these instances, the feature setting 118 may define operational parameters of the peripheral device 106. The peripheral device 106 may implement the operational parameters to perform one or more tasks associated with the building 102. Using the controlling device 120 and/or the dock 124, the user 104 may exchange information with the service provider 114. For example, the user 104 may be a subscriber who subscribes to a service (e.g., a building automation service) provided by the service provider 114.

The service provider 114 may also provide a service related to application registration 126, which enables a peripheral application provider 128 to upload, install, and/or register a peripheral application associated with the peripheral device 106 via a computing device 130 (e.g., a server). In some embodiments, multiple peripheral application providers may provide various peripheral applications for multiple peripheral devices in the building 102. In these instances, the controlling device 120 may have consistent user interface design elements for the plurality of peripheral applications.

Illustrative Architecture

Figure 2:
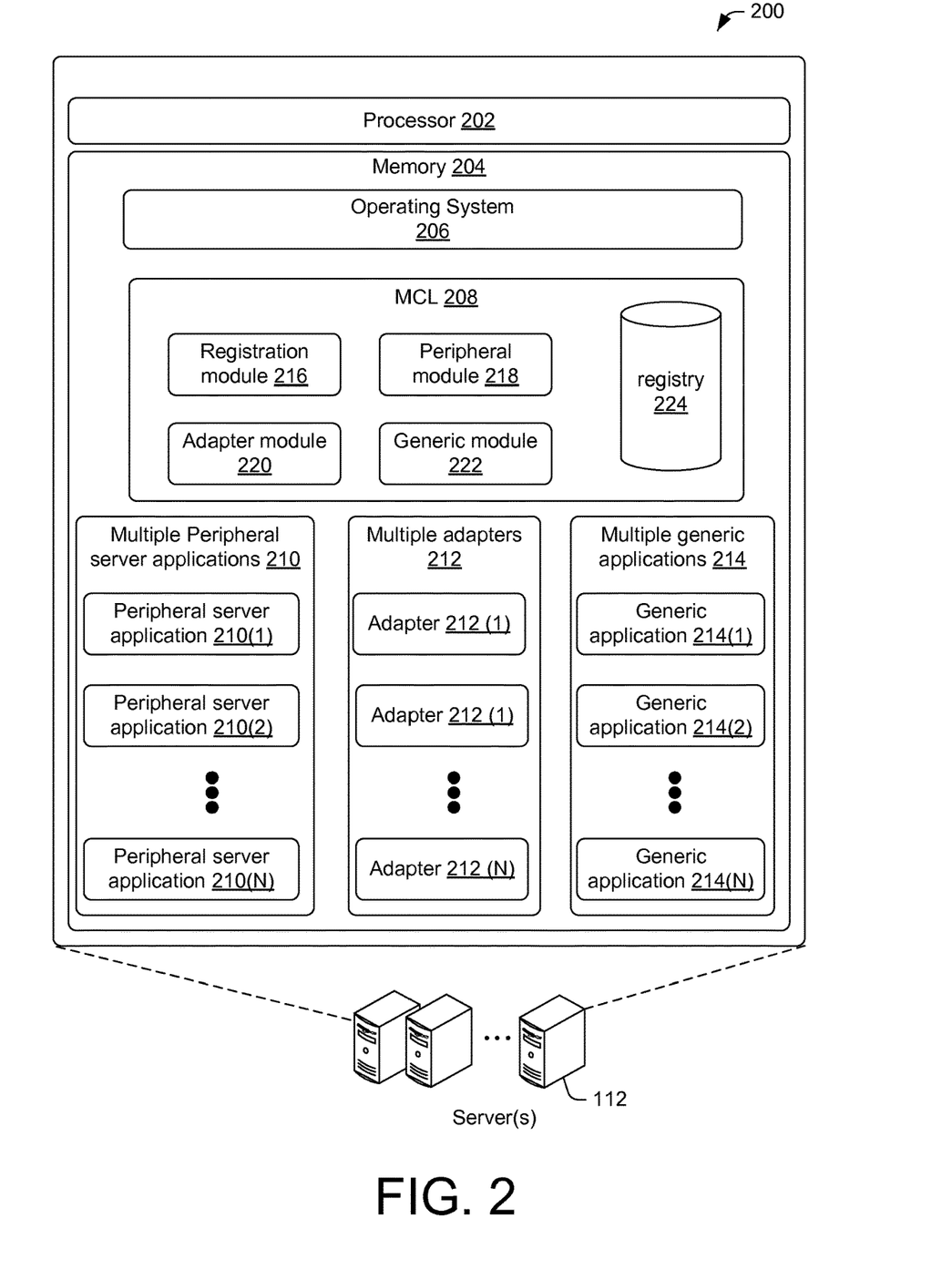
FIG. 2 is a schematic diagram of an illustrative server-side computing architecture that enables wireless building automation.

FIG. 2 is a schematic diagram of an illustrative server-side computing architecture 200 to enable wireless building automation. The computing architecture 200 shows additional details of at least one portion of the server 112, which may include additional modules, kernels, data, and/or hardware.

The computing architecture 200 may include a processor 202 and memory 204. The memory 204 may store various modules, applications, programs, or other data. The memory 204 may include instructions that, when executed by the processor 202, cause the processor 202 to perform the operations described herein for the server 112. The processor 202 may include one or more graphics processing units (GPU) and one or more central processing units (CPU).

The server 112 may have additional features and/or functionality. For example, the server 112 may also include additional data storage devices (removable and/or non-removable). Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the server 112. Any such computer storage media may be part of the server 112. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

The memory 204 may store an operating system 206 as well as a master controlling layer (MCL) 208, multiple peripheral server applications 210, multiple adapters 212, multiple generic applications 214, etc. The MCL 208 may include a registration module 216, a peripheral module 218, an adapter module 220, a generic module 222, and a registry 224.

The registration module 216 may be configured to receive a registration request for a peripheral application (e.g., a peripheral server application 210(1)) associated with the peripheral device 106. For example, the registration request may include at least one of an input parameter, an output parameter, or a control command that are associated with the peripheral server application 210(1).

The registration module 216 may determine whether the server peripheral application 210(1) is a non-native application or a native application. In some embodiments, the registration module 216 may determine that the peripheral server application 210(1) is a non-native application if a peripheral control protocol associated with the peripheral application differs from a generic control protocol associated with a generic control application (e.g., a generic application 214(1)).

As defined here, a protocol (e.g., the peripheral control protocol and the generic control protocol) may include a communication hardware/software language that transmits instructions to and from a device, either through wired or wireless communication. The protocol may exposes itself programmatically via an application programming interface (API). For example, a native application may use the generic control protocol and therefore may not use translation/transformation via an adapter 212(1). A non-native application that uses a proprietary protocol (e.g., the peripheral control protocol) from the peripheral application provider 128, and therefore may use adapter 212(1) to perform translation/transformation.

In some embodiments, the registration module 216 determines that that the peripheral server application 210(1) is a non-native application. In these instances, the registration module 216 may identity the adapter 212(1) from the multiple adapters 212 based on the determined peripheral server application 210(1), which may be installed on the server 112. The registration module 216 may then register the peripheral server application 210(1) by associating the adapter 212(1) and the generic application 214(1) with the peripheral server application 210(1). The registration module 216 may then store the association in a registry, for example, a registry 224. For example, the registration module 216 may record the association of the adapter 212(1) and the generic application 214(1) with the peripheral server application 210(1) in a look up table, which is stored in and/or maintained by the registry 224.

In some embodiments, the registration module 216 determines that the peripheral server application 210(1) is a native application. In these instances, the registration module 216 may install the peripheral server application 210(1) on the server 112, and register the peripheral server application 210(1) by associating the generic application 214(1) with the peripheral server application 210(1). The registration module 216 may then store the association in, for example, in the registry 224.

In some embodiments, the registration module 216 may receive a deregistration request for the peripheral server application 210(1). In these instances, the registration module 216 may remove the peripheral server application 210(1) from the server 112, and/or remove the association of the generic application 214(1) with the peripheral server application 210(1) from the look up table.

In the event that the registration module 216 removes the peripheral server application 210(1) or removes the association of the generic applications 214(1) with the peripheral server application 210(1), the registration module 216 may deactivate commands or features dependent on the peripheral server application 210(1). In the event that the peripheral server application 210(1) is re-registered, the registration module 216 may reactivate the commands or the features that were dependent on the peripheral server applications 210(1).

In some embodiments, the registration module 216 may also provide a software development kit (SDK) associated with the generic application 214(1) or the adapter 212(1), or a combination thereof. In these instances, the SDK may provide a plurality of APIs or developer tools of a plurality of services associated with the service provider 114.

The MCL 208 may also include the peripheral module 218 configured to communicate with various computing devices (e.g., the peripheral device 106, controlling device 120 and/or the dock 124). In some embodiments, the peripheral module 218 may receive a feature setting command associated with the peripheral device 106 from the controlling device 120. For instances, the feature setting command may include a command name, a feature name, and the features setting 118 that are associated with the peripheral device 106.

In some embodiments, after receiving the feature setting command, the MCL 208 may extract a script based on the command name. For example, a script manager of the MCL 208 may extract the script based on the command name using a command table, which includes a set of command names and a corresponding script. The script manager may then extract/generate parameters, including the feature setting in a predetermined format, using a command parameter table that includes corresponding parameter formats. The parameters and the script may be provided to a command handler of the MCL 208 for execution and generation of certain data. The certain data may be then sent to the peripheral server application 210(1) for execution and generation of the command 116.

In some embodiments, the generic module 222 may select and/or invoke the generic application 214 to transform the feature setting command into a generic command. The peripheral module 218 may identify a peripheral application (e.g., a peripheral server application 210(1)) corresponding the feature setting command. In these instances, the peripheral module 218 may determine that the peripheral application is a non-native application if a peripheral control protocol associated with the peripheral server application 210(1) differs from a generic control protocol associated with the generic command. In response to the determination, the adapter module 220 may select and/or invoke the adapter 212(1) to translate the generic control protocol of the generic command to the peripheral control protocol associated with the peripheral server application 210(1). For example, the adapter module 220 may determine an adapter corresponding to the peripheral server application 220(1), and use the adapter 212(1) to translate the generic command from the generic control protocol to the peripheral control protocol associated with the peripheral server application 210(1). In these instances, the MCL 208 may execute the peripheral server application 210(1) based on the generic command in the peripheral control protocol to generate the command 116 for performance of a certain task on the peripheral device 106.

In some embodiments, the building 102 may include multiple peripheral devices. In these instances, the features setting 118 may correspond to a portion or all of the multiple peripheral devices. For example, the multiple peripheral devices may be at least one of located in a single room, associated with the certain task, or associated with a predetermined building automation pattern.

In some embodiments, the MCL 208 may receive an authentication credential from the controlling device 120, and then establish, based on the authentication credential, a connection between the server 112 and the controlling device 120. In these instances, the authentication credential may also be associated with a privilege for controlling the one or more peripheral devices. For example, the user 104 may not have a privilege to control a TV set in the building 102 after 10:00 PM if the user 104 is a minor. As another example, the user 104 may not have a privilege for controlling a security device in the building 102 at any time if the user is less than a predetermined age (e.g., 10 years old).

In some embodiments, the peripheral device 106 may provide a message (e.g., a report) to the MCL 208 via the controller 108. The message may include, for example, a current working status of the peripheral device 106 and/or alerts. The alerts may be generated by the peripheral device 106 and/or the controller 108. In some embodiments, in response to receiving the message, the MCL 208 may generate a status report, and provide the status report to the controlling device 120. In some embodiments, the MCL 208 may generate a set of instructions in a predetermined manner to trigger a plurality of peripheral devices associated with the building 102. For example, the MCL 208 may receive a civil defense warning or a severe weather warning from the peripheral device 106 and/or other resources. In response to these warnings, the MCL 208 may trigger one or more alerting devices (e.g., a sounding alarm, a security camera in a certain area of the building 102, etc.) and one or more other peripheral devices (e.g., lights, phones, etc.). In these instances, the predetermined manner may be defined by the user 104, the peripheral application provider 128, and/or the service provider 114.

In some embodiments, the MCL 208 may receive a plurality of messages (e.g., alerts) from, for example, a plurality of peripheral devices in the building 102 that are provided by different peripheral application providers and/or are implemented using different protocols. The MCL 208 may further provide the plurality of messages to the controlling device 120. In these instances, the controlling device 120 may have a consistent manner to receive and handle the messages from the plurality of peripheral devices.

Figure 3:
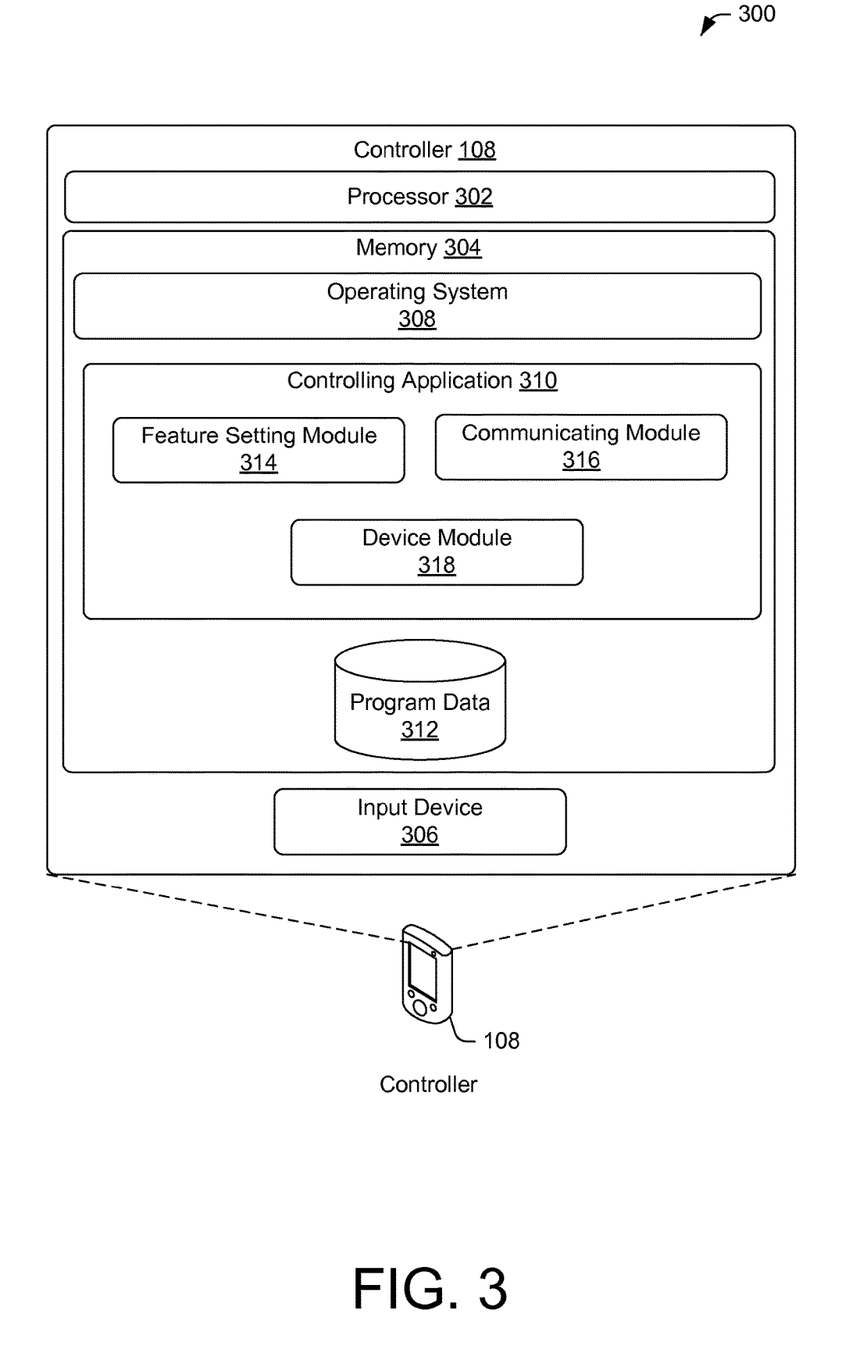
FIG. 3 is a schematic diagram of an illustrative client-side computing architecture that enables wireless building automation.

FIG. 3 is a schematic diagram of an illustrative client-side computing architecture to enable wireless building automation. The computing architecture 300 shows additional details of at least one portion of the controller 108, which may include additional modules, kernels, data, and/or hardware.

The computing architecture 300 may include a processor 302 and memory 304. The memory 304 may store various modules, applications, programs, or other data. The memory 304 may include instructions that, when executed by the processor 302, cause the processor 302 to perform the operations described herein for the controller 108. The processor 302 may include one or more graphics processing units (GPU) and one or more central processing units (CPU).

The computing architecture 300 may also have an input device 306 such as keyboard, mouse, pen, voice input device, touch input device (e.g., stylus, pen, etc.), touch screen device, navigation devices (e.g., track pad, mouse, etc.) etc. In some embodiments, input methods may be implemented via Natural User Interface (NUI). NUI may include any interface technology that enables a user to interact with a device in a "natural" manner, free from artificial constraints imposed by input devices such as mice, keyboards, remote controls, and the like. Examples of NUI methods may include those relying on speech recognition, touch and stylus recognition, gesture recognition both on screen and adjacent to the screen, air gestures, head and eye tracking, voice and speech, vision, touch, gestures, and machine intelligence. Categories of NUI technologies may include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (Electroencephalography (EEG) and related methods).

The controller 108 may have additional features and/or functionality. For example, the controller 108 may also include additional data storage devices (removable and/or non-removable). Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the controller 108. Any such computer storage media may be part of the controller 108. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

The memory 304 may store an operating system 308, a controlling application 310, program data 312, etc. The controlling application 310 may further include a feature setting module 314, a communication module 316, a device module 318, etc.

In some embodiments, the feature setting module 314 may be configured to provide a control selection associated with the peripheral device 106 on the interface 122. In response to receiving a user selection from the interface 122 via the input device 306, the feature setting module 314 may generate the feature setting command based on the user selection.

The controlling application 310 may also include the communication module 316 configured to enable a communication between the peripheral device 106 and the controlling device 120. The communication may be implemented using a protocol, which is a communication language that transmits instructions to and from a device, either through wired or wireless communications. For example, the protocol may include a building automation protocol, such as X10, Insteon, Universal Powerline Bus (UPB), KNX, Zig-Bee, Z-Wave, etc. In some embodiments, the protocol may include Wi-Fi, Bluetooth or Near Field Communication (NFC), etc., which are not specific for the building automation.

In some embodiments, the communication module 316 may also enable a communication between the controller 108 and a service provider (e.g., the server 112). For example, the communication module 316 may provide the feature setting command to the server 112. In some embodiments, the communication module 316 may enable integration with one or more other service system (e.g., a policy system). In some embodiments, the communication module 316 may enable communications between the controlling device 120 and a persistent system, which store telemetry data associated with the building 102. For example, the telemetry data may indicate an amount of energy usage with respect to the temperature set by the user 104 within a predetermined time period.

The controlling application 310 may also include the device module 318 configured to enable user 104 to manage peripheral devices (e.g., the peripheral device 106) in the building 102. Based on a user input, the device module 318 may enlist/de-enlist the peripheral device 106 such that input, output and control may be made accessible to the controlling device 120.

Illustrative Process

Figure 4:
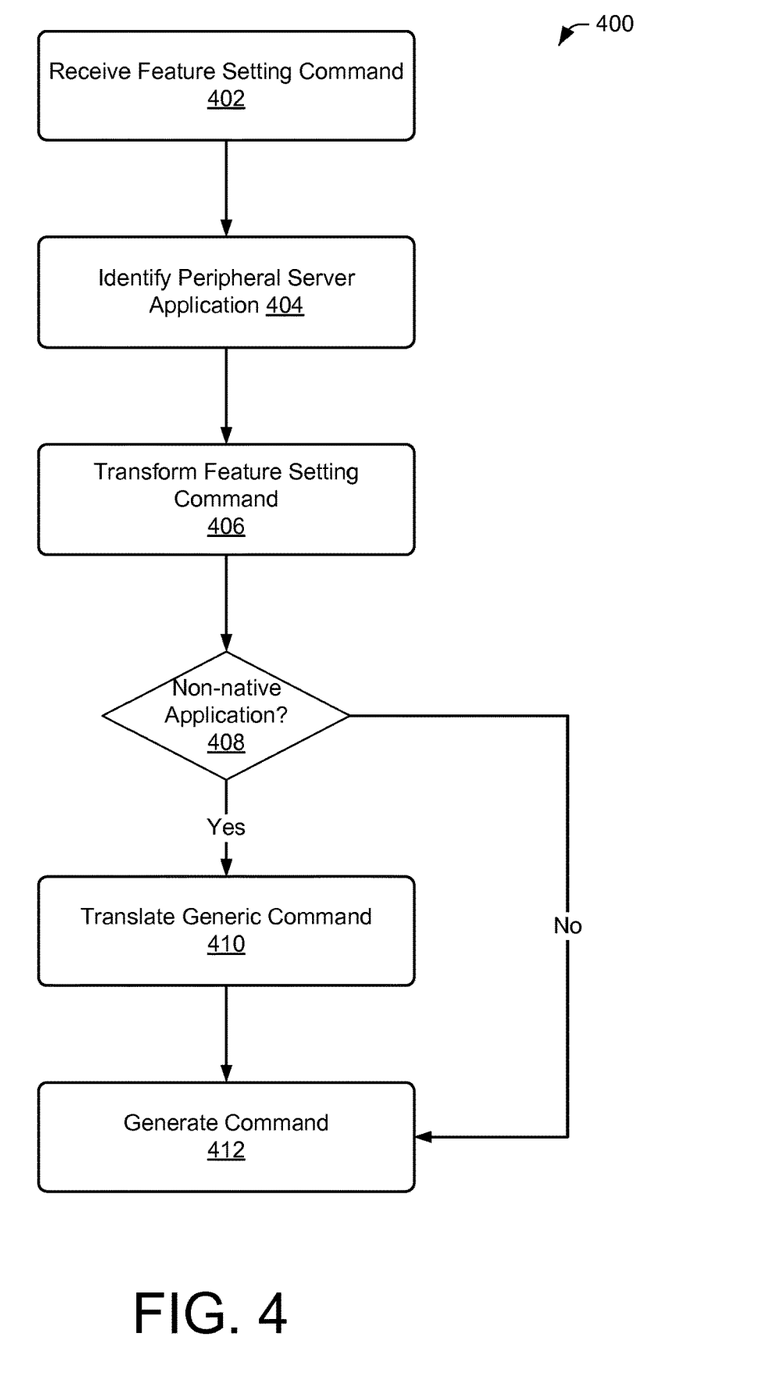
FIG. 4 is a flow diagram of an illustrative process for implementing wireless building automation.

FIG. 4 is a flow diagram of an illustrative process 400 for implementing wireless building automation. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes (e.g., process 500) described throughout this disclosure, in addition to process 400, shall be interpreted accordingly. The process 400 is described with reference to the computing environment 100 and the computing architectures 200 as well as 300. However, the process 400 may be implemented in other environments, and/or computing architecture.

At 402, the one or more processors of the server 112 may receive a feature setting command associated with the peripheral device 106 from the controller 108. For example, the features setting command may include a command name, a feature name, and the features setting 118 that are associated with the peripheral device 106. In some embodiments, the one or more processors of the server 112 may receive an authentication credential from the controller 108, and then establish, based on the authentication credential, a connection between the server 112 and the controller 108. In these instances, the authentication credential may be associated with a privilege for controlling the peripheral device 106.

At 404, the one or more processors of the server 112 may then identify a peripheral application (e.g., the peripheral server application 210(1)) corresponding the feature setting command and installed on the server. In some embodiments, the one or more processors of the server 112 may identify one or more generic scripts corresponding to the feature setting command, determine the peripheral application corresponding to the one or more generic scripts. For example, the one or more processors of the server 112 may execute the one or more generic scripts to transforming the feature setting command into the generic command. In some embodiments, the building 102 may include multiple peripheral devices, which may be at least one of located in a single room of the building 102, associated with a certain task, or associated with a predetermined building automation pattern. In some embodiments, the one or more processors of the server 112 may determine an adapter (e.g., the adapter 212(1)) corresponding to the peripheral server application 210(1), and translate, using the adapter 212(1), the generic command from the generic control protocol to the peripheral control protocol associated with the peripheral server application 210(1).

At 406, the one or more processors of the server 112 may transform the feature setting command into a generic command. For example, the MCL 208 may select the generic application 214(1) to transform the feature setting command into the generic command.

At 408, the one or more processors of the server 112 may determine whether the peripheral server application 210(1) is a non-native application. In some embodiments, the one or more processors of the server 112 may determine that the peripheral server application 210(1) is a non-native application if the peripheral control protocol associated with the peripheral server application 210(1) differs from the generic control protocol associated with the generic command. In these instances, a protocol may expose itself programmatically via an API. The native application may use the generic control protocol and therefore need no translation/transformation via one or more of the multiple adapters 212. A non-native application may use a proprietary protocol, for example from the peripheral application provider 128, and therefore needs an adapter (e.g., the adapter 212(1) to perform the translation/transformation.

In response to a determination that the peripheral server application 210(1) is a non-native application (i.e., the branch "Yes" of the operation 408), the one or more processors of the server 112 may translate, for example using the adapter 212(1), a generic control protocol of the generic command to a peripheral control protocol associated with the peripheral server application 210(1) at 410. In these instances, the peripheral server application 210(1) may be a peripheral server application installed on the server 112 and may correspond to a peripheral client application on the peripheral device 106.

At 412, the one or more processors of the server 112 may execute the peripheral server application 210(1) based on the generic command in the peripheral control protocol to generate a command for performance of a certain task on the peripheral device 106. In response to a determination that the peripheral server application 210(1) is a non-native application (i.e., the branch "No" of the operation 408), the one or more processors of the server 112 may generate the command without using the adapter 212(1).

Figure 5:
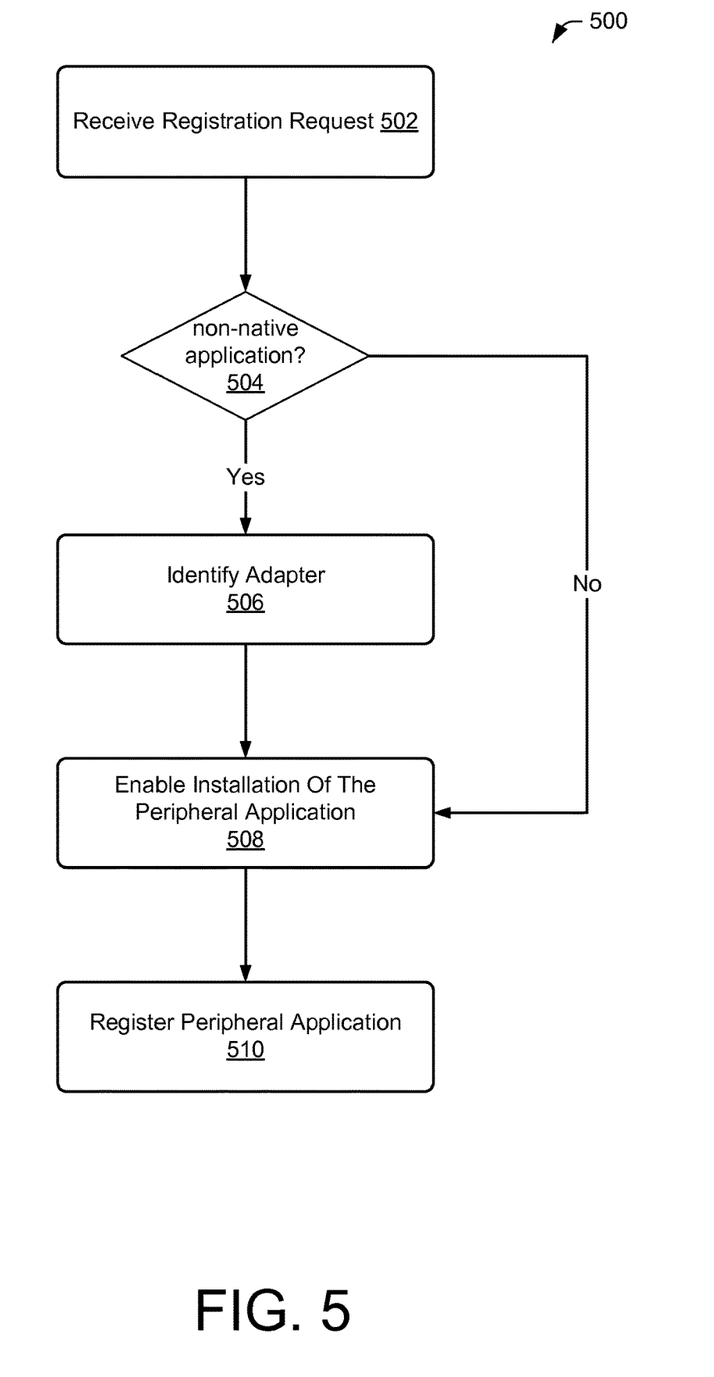
FIG. 5 is another flow diagram of an illustrative process for registering a peripheral application for wireless building automation.

FIG. 5 is another flow diagram of an illustrative process 500 for registering a peripheral application for wireless building automation. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 500 is described with reference to the computing environment 100 and the computing architectures 200 as well as 300. However, the process 500 may be implemented in other environments, and/or computing architecture.

At 502, one or more processors of the server 112 may receive a registration request for a peripheral application associated with the peripheral device 106. For example, after registration, the peripheral application may be installed on the server 112 and therefore become a registered peripheral server application (e.g., the peripheral server application 210(1)). A corresponding peripheral client application may be installed or embedded on the peripheral device 106. In some embodiments, the registration request may include at least one of an input parameter, an output parameter, or a control command that are associated with the peripheral application.

At 504, the one or more processors of the server 112 may determine whether the peripheral application is a non-native application. In some embodiments, the one or more processors of the server 112 may determine that the peripheral application is a non-native application if the peripheral control protocol associated with the peripheral application differs from the generic control protocol associated with the generic command. In these instances, a protocol may expose itself programmatically via an API. The native application may use the generic control protocol and therefore use no translation/transformation via one or more of the multiple adapters 212. A non-native application may use a proprietary protocol, for example from the peripheral application provider 128, and therefore needs an adapter (e.g., the adapter 212(1) to perform the translation/transformation.

In response to a determination that that the peripheral application is a non-native application (i.e., the branch "Yes" of the operation 504), the one or more processors of the server 112 may identify an adapter (e.g., the adapter 212(1)) based on the peripheral application at 506.

At 508, the one or more processors of the server 112 may install or enable installation of the peripheral application on the server 112. In response to a determination that that the peripheral application is a native application (i.e., the branch "No" of the operation 504), the one or more processors of the server 112 may install or enable the installation of the peripheral application on the server 112 without identifying the corresponding adapter (e.g., the adapter 212(1)).

At 510, the one or more processors of the server 112 may register the peripheral application by associating the adapter 212(1) and a generic control application with the peripheral application. This association of the adapter and the generic control application with the peripheral application may be stored by the one or more processors of the server 112. In some embodiments, the one or more processors of the server 112 may store the association of the adapter and the generic control application with the peripheral application in a look up table.

In some embodiments, the one or more processors of the server 112 may receive a deregistration request for the peripheral server application 210(1) associated with the peripheral device 106. The one or more processors of the server 112 may remove the peripheral server application 210(1) from the server 112 and/or remove the association of the generic control application with the peripheral application from, for example, the lookup table.

In the event that the one or more processors of the server 112 remove the peripheral server application 210(1) or remove the association of the generic applications 214(1) with the peripheral server application 210(1), the one or more processors of the server 112 may deactivate commands or features dependent on the peripheral server application 210(1). In the event that the peripheral server application 210(1) is re-registered, the one or more processors of the server 112 may reactivate the commands or the features that were dependent on the peripheral server applications 210(1).

In some embodiments, the one or more processors of the server may also provide a software development kit (SDK) associated with the generic control application or the adapter, or combination thereof. In these instances, the SDK may provide a plurality of APIs or developer tools of a plurality of services associated with building automation.

Conclusion

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method for controlling a peripheral device, the method comprising:

receiving, from a controlling device and by a server comprising one or more processors, a feature setting command associated with the peripheral device and an authentication credential associated with a client access privilege for control of the peripheral device, wherein the peripheral device is configured to perform a certain task and the feature setting command comprises a command name, a feature name, and a feature setting that is associated with the peripheral device;

authenticating the client access privilege for control of the peripheral device, based at least in part on the authentication credential;

determining, by the server, that the client access privilege permits performance of the certain task on the peripheral device that is associated with the feature setting command;

identifying, by the server, a peripheral application that corresponds to the feature setting command, the peripheral application being installed on the server;

transforming, by the server, the feature setting command into a generic command, the generic command being associated with performance of the certain task on the peripheral device, the generic command requiring translation into a peripheral control protocol command for performance of the certain task on the peripheral device;

determining, by the server, that the peripheral application is a non-native application, the non-native application corresponding to an application that uses a peripheral control protocol that is different from a generic control protocol associated with a native application and the generic command; and translating the generic control protocol of the generic command to the peripheral control protocol associated with the peripheral application;

executing the peripheral application using the peripheral control protocol, based at least in part on the generic command, the peripheral application to generate the peripheral control protocol command for performance of the certain task on the peripheral device; and causing performance of the certain task on the peripheral device based at least in part on the peripheral control protocol.

2. The method of claim 1, wherein identifying the peripheral application that corresponds to the feature setting command comprises:

identifying one or more generic scripts corresponding to the feature setting command; and determining that the peripheral application corresponds to the one or more generic scripts, and wherein transforming the feature setting command into the generic command comprises:

executing the one or more generic scripts that transform the feature setting command into the generic command.

3. The method of claim 1, wherein the peripheral device is further located in a single room or associated with a predetermined home automation pattern.

4. The method of claim 1, wherein translating the generic command from the generic control protocol to the peripheral control protocol associated with the peripheral application comprises:

determining an adapter that corresponds to the peripheral application; and translating, using the adapter, the generic command from the generic control protocol to the peripheral control protocol associated with the peripheral application.

5. The method of claim 1, further comprising:
establishing a connection between the server and the controlling device, based at least in part on the authentication credential.

6. The method of claim 1, further comprising:
receiving a message associated with the peripheral device;
generating a status message based on the message; and
providing the status message to the controlling device.

7. The method of claim 1, further comprising:
receiving a message associated with the peripheral device;
selecting a predetermined command setting corresponding to the message; and
providing the predetermined command setting to the peripheral device.

8. One or more non-transitory computer-storage media storing computer-executable instructions that, when executed on one or more processors, causes the one or more processors to perform acts comprising:

receiving a registration request for a peripheral application associated with a peripheral device, the peripheral device being associated with a certain task;

determining that the peripheral application is a non-native application, the non-native application corresponding to an application that uses a proprietary control protocol that is different from a generic control protocol associated with a native application and a generic command;

identifying an adapter based on the peripheral application, the adapter being configured to translate a generic control protocol of a generic command to the proprietary control protocol of the peripheral application, the generic command being associated with performance of a certain task on the peripheral device;

installing the peripheral application on a server;

registering the peripheral application to generate a peripheral control protocol command for performance of the certain task on the peripheral device by associating the adapter and a generic control application with the peripheral application, the generic control application being configured to transform a feature setting command associated with the peripheral device into a generic command, the feature setting command comprising a command name, a feature name, and a feature setting that is associated with the peripheral device; and storing an association of the peripheral application with the adapter and the generic control application.

9. The one or more non-transitory computer-storage media of claim 8, wherein determining that the peripheral application is the non-native application comprises determining that a peripheral control protocol associated with the peripheral application differs from a generic control protocol associated with the generic control application.

10. The one or more non-transitory computer-storage media of claim 8, wherein the acts further comprise:

receiving an additional registration request for an additional peripheral application associated with an additional peripheral device;

determining that the additional peripheral application is a native application:

registering the additional peripheral application by associating a generic control application with the additional peripheral application; and storing an association of the generic control application with the additional peripheral application.

11. The one or more non-transitory computer-storage media of claim 8, wherein storing the association of the peripheral application with the adapter and the generic control application comprises storing the association in a look up table.

12. The one or more non-transitory computer-storage media of claim 8, wherein the acts further comprise:
receiving a deregistration request for the peripheral application associated with the peripheral device;
removing the peripheral application from the server; and
removing the association of the generic control application with the peripheral application.

13. The one or more non-transitory computer-storage media of claim 8, wherein the registration request comprises at least one of an input parameter, an output parameter, or a control command that is associated with the peripheral application.

14. The one or more non-transitory computer-storage media of claim 8, wherein the acts further comprise:
providing a software development kit (SDK) associated with the generic control application or the adapter, or combination thereof, the SDK providing a plurality of application programming interfaces (APIs) or developer tools of a plurality of services associated with home automation.

15. A system comprising:
one or more processors; and
memory to maintain a plurality of components executable by the one or more processors, the plurality of components comprising:
a master control layer configured to:
receive, from a controlling device, a feature setting command that is associated with a peripheral device and an authentication credential associated with a client access privilege for control of the peripheral device, wherein the peripheral device is configured to perform a certain task and the feature setting command comprises a command name, a feature name, and a feature setting that is associated with the peripheral device,
authenticate the client access privilege for control of the peripheral device, based at least in part on the authentication credential,
determine that the client access privilege permits performance of a certain task on the peripheral device that is associated with the feature setting command;
identify a peripheral application that corresponds to the feature setting command,
transform the feature setting command into a generic command, the generic command being associated with performance of a certain task on the peripheral device, and
determine that the peripheral application is a non-native application, the non-native application corresponding to an application that uses a proprietary control protocol that is different from a generic control protocol associated with a native application and the generic command;
an adapter configured to convert the generic command from a generic control protocol to a peripheral control protocol associated with the peripheral application; and
the peripheral application configured to generate a command for performance of a certain task on the peripheral device.

16. The system of claim 15, wherein the controlling device comprises:
at least one processor,
additional memory, and
a controlling application, stored in the additional memory and executable on the at least one processor, the controlling application configured to:
provide, via a user interface, a control selection associated with the peripheral device,
receive, via the user interface, a user selection that corresponds to the control selection, and
generate the feature setting command based on the user selection.

17. The system of claim 16, wherein the plurality of components are further executable by the at least one processor to:
receive, from the controlling application of the controlling device, telemetry data associated with a physical structure that contains the peripheral device, the telemetry data indicating at least energy usage over a predetermined time period; and
generate a status report associated with the physical structure, based at least in part on the telemetry data.

18. The system of claim 16, further comprising:
a dock configured to at least one of:
charge a rechargeable cell in the controlling device;
enable updating of software or firmware contained in the controlling device; or
enable wireless communication between the controlling device and the master control layer.

19. The system of claim 18, wherein the dock is further configured to:
receive cancellation associated with the controlling device; and
enable termination of the wireless communication between the controlling device and the master control layer.

20. The system of claim 18, wherein the dock is further configured to:
collect information of the peripheral device that indicates operational parameters or identifiers of the peripheral device; and
receive information of a physical structure containing the peripheral device, the information of the physical structure indicating a physical layout of the physical structure and locations of the peripheral device in the physical structure; and
transmit the information of the peripheral device and the information of the physical structure to the plurality of components.

21. The system of claim 20, wherein the master control layer is further configured to:
receive a warning message that is associated with a physical structure that contains the peripheral device;
identify an alerting device that is associated with the physical structure, based at least in part on the information of the physical structure, the alerting device corresponding to a sounding alarm, a security camera within a predetermined proximity of the physical structure, or the peripheral device; and
trigger the alerting device based at least in part on the warning message.

22. The system of claim 18, wherein the dock is further configured to:
in response to receipt of the user selection associated with the peripheral device, enable a wireless connection between the plurality of components and the peripheral device.

23. The system of claim 18, wherein the dock is further configured to:

enable generation of a feature setting associated with the peripheral device, and wherein the feature setting defines operational parameters of the peripheral device.

24. The system of claim 23, wherein the dock is further configured to:
    enable association of a button of the controlling device with the feature setting.

25. The system of claim 15, wherein the plurality of components further comprise a registering module configured to:
    receive a registration request for the peripheral application associated with the peripheral device,
        identify at least one adapter based on the peripheral application, install the peripheral application on a server,
    register the peripheral application by associating the adapter and a generic control application with the peripheral application, and
    store the association of the peripheral application with the adapter and the generic control application.

26. The system of claim 15, wherein the master control layer is further configured to:
    receive, from the peripheral device, an alert associated with a working status of the peripheral device;
    generate a status report of the peripheral device, based at least in part on the alert; and
    transmit the status report to the controlling device.

27. The system of claim 15, wherein the master control layer is further configured to:
    receive, from an external computing resource, a warning message that is associated with a physical structure that contains the peripheral device, the warning message corresponding to one of a civil defense warning or a severe weather warning;
    generate a set of predetermined instructions to trigger the peripheral device within the physical structure; and
    trigger the peripheral device based at least in part on the set of predetermined instructions.

* * * * *